United States Patent [19]

Sakazume

[11] 4,335,825
[45] Jun. 22, 1982

[54] RESERVOIR TANK

[75] Inventor: Takeshi Sakazume, Kawasaki, Japan

[73] Assignee: Tokico Ltd., Kanagawa, Japan

[21] Appl. No.: 170,877

[22] Filed: Jul. 21, 1980

[30] Foreign Application Priority Data

Jul. 20, 1979 [JP] Japan .................. 54/100267[U]

[51] Int. Cl.³ .............. B65D 25/54; B65D 25/56; G01F 23/02
[52] U.S. Cl. .................. 220/82 R; 60/537; 73/323; 116/227; 220/82 A; 220/377
[58] Field of Search ............ 220/82 R, 82 A, 82.5, 220/377; 60/537; 116/227; 73/323

[56] References Cited

U.S. PATENT DOCUMENTS

| | | | |
|---|---|---|---|
| 2,917,924 | 12/1959 | Messick | 220/82 R |
| 3,000,345 | 9/1961 | Gray | 220/82 R |
| 3,096,648 | 7/1963 | Dombeck | 220/82 R |
| 3,248,946 | 5/1966 | Litchenberg | 220/82 R |
| 4,133,287 | 1/1979 | Downs | 220/82 R |
| 4,166,431 | 9/1979 | Pickering | 220/82 R |

Primary Examiner—George E. Lowrance
Attorney, Agent, or Firm—Wenderoth, Lind & Ponack

[57] ABSTRACT

The invention is related to a reservoir tank receiving liquid therein and having a peep hole in a side wall for visually inspecting the interior of the tank. The peep hole is formed by a cup-shaped member having a transparent bottom wall, a cylindrical side wall sealingly fitted into an opening formed in the side wall of the reservoir tank, and a plurality of retaining portions formed adjacent the open end portion of the cup-shaped member for engagement with the peripheral edge of the opening.

3 Claims, 7 Drawing Figures

RESERVOIR TANK

BACKGROUND OF THE INVENTION

This invention relates to reservoir tanks and, particularly, to a master cylinder including a reservoir tank integrally provided on the upper portion of the master cylinder. Typically, the master cylinder is used in a hydraulic braking system of an automobile.

One of the prior art conventional master cylinders comprises a transparent window in a side wall of the reservoir tank for allowing the visual inspection of the level of liquid received in the reservoir tank. The dimension and the location of the transparent window which acts as a peep hole are determined so as to allow an examination of whether the liquid level in the reservoir tank is near a predetermined minimum level or not. Usually, the transparent window comprises a glass plate integrally molded in an annular rubber ring which is reinforced by an annular metal ring integrally molded therewith, and the rubber ring is forcibly fitted in an opening formed in the side wall of the reservoir tank. However, the glass plate and the metal ring must be retained with respect to a mutually aligned positional relationship in the molding process and, therefore, the reservoir tanks are expensive to manufacture. Further, the rubber ring is retained in the opening in the side wall of the reservoir tank solely by the frictional resistance therebetween, thus the window will sometimes slip or slide out of the reservoir tank.

SUMMARY OF THE INVENTION

One of the objects of the present invention is to provide a reservoir tank eliminating the aforementioned shortcomings. The reservoir tank according to the present invention comprises a transparent window formed by a cup-shaped member with the bottom portion thereof being transparent and having an open end portion being provided with a retaining portion. The cup-shaped member is sealingly mounted in an opening formed in the side wall of the reservoir tank with the retaining portion engaging with the inner edge of the opening.

The cup-shaped member according to the invention can be easily manufactured, thereby reducing the manufacturing costs. Additionally, the previously mentioned slippage or sliding of the window is effectively prevented.

BRIEF DESCRIPTION OF THE DRAWINGS

Further objects and advantages of the invention will become apparent from the following detailed description taken in conjunction with the accompanying drawings, in which.

DETAILED DESCRIPTION OF THE PREFERRED EMBODIMENTS

Figure 1:
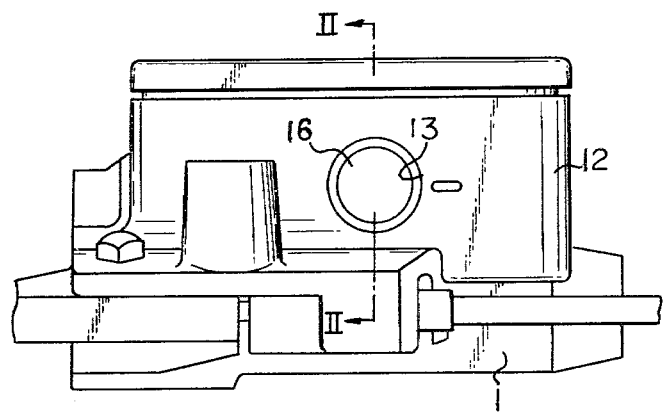
FIG. 1 is a side view of a master cylinder according to the invention.
Figure 2:
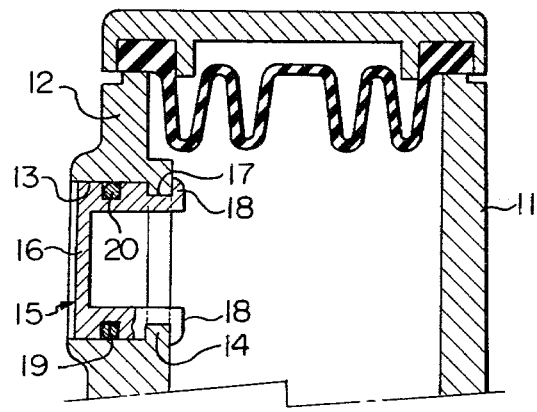
FIG. 2 is an enlarged sectional view taken along line II—II in FIG. 1.

The master cylinder shown in FIGS. 1 and 2 comprises a cylinder housing 1 having a reservoir tank 11 integrally formed on the upper portion of the cylinder housing 1. A circular opening 13 is formed through one side wall 12 of the reservoir tank, and a transparent window 16 is provided in the opening 13 to function as a peep hole for allowing the visual inspection of the level of the liquid contained in the reservoir tank. It will be noted that when inspecting the liquid level of a reservoir tank in the hydraulic braking system of a vehicle, it is not necessary to be able to visually ascertain any liquid level therein, but rather the transparent window is provided so as to allow a visual examination to determine whether the liquid level approximates predetermined minimum level or not.

Figure 7:
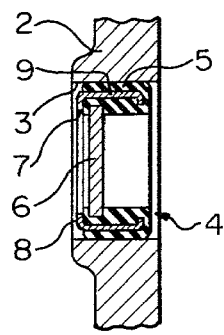
FIG. 7 is a view similar to FIG. 3 but showing the prior art.

A typical prior art construction of the transparent window is shown in FIG. 7, in which, a circular opening 3 is formed in a side wall 2 of a reservoir tank, and the opening 3 is closed by a cap 4. The cap 4 comprises an annular rubber ring 5, a transparent glass plate 6 and an annular reinforcing metal ring 8. The glass plate 6 and the metal ring 8 are integrally molded with the rubber ring 5. The metal ring 8 includes a cylindrical portion 9 which extends generally along the entire length of the rubber ring 5 in the axial direction and a flange portion having a window 7 therein. The rubber ring 5 is forcibly fitted in the opening 3 and is retained solely by the frictional resistance. The glass plate 6 and the metal ring 8 must be maintained in a mutually aligning relationship with each other and with respect to the rubber ring 5 during the molding process, thus the manufacturing process is difficult and thereby expensive. Further, the cap 4 will sometimes escape out of the opening 3.

In the embodiment of the invention as shown in FIG. 2, there is provided an opening 13 in a side wall 12 of the reservoir tank 11. An annular flange 14 extends radially inward from the inner edge of the opening 13. A cup-shaped member 15 formed of a synthetic resin material is sealingly fitted in the opening 13. The cup-shaped member 15 includes a transparent bottom wall 16 having a relatively small thickness for functioning as a peep hole, a plurality of pawl-shaped retaining members or portions 18 each having a recessed portion 17, and an annular groove 19 formed in its outer peripheral surface. Because the members 18 are of synthetic resin, they are resilient. The member 15 has a cylindrical shape adapted to snugly fit into the opening 13. The retaining portions 18 are provided adjacent the open end portion of the cup-shaped member 15. The cup-shaped member 15 is fitted in the opening 13 with the retaining portions 18 abutting the peripheral edge of the opening 13 and the recessed portions 17 thereof and because of their resiliency, they snappingly engage the annular flange 14. A seal such as an O-ring 20 is received in the groove 19 to seal the interior of the reservoir tank from the outside. In installing the member 15 in the opening 13 the retaining portions 18 resiliently deflect in the radially inward direction so that the recessed portions 17 snappingly engage the radial flange 14. The cup-shaped member 15 is reliably retained in its position, and the liquid level in the reservoir tank can easily be observed when the level approximates the predetermined minimum level.

Figure 3:
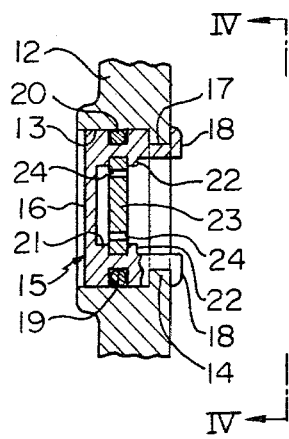
FIG. 3 is a partially sectional view showing the essential features of a second embodiment of the present invention.
Figure 4:
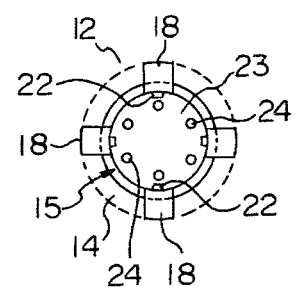
FIG. 4 is a side view as taken along line IV—IV in FIG. 3.

The second embodiment illustrated in FIGS. 3 and 4 is a modified form of the embodiment of FIG. 2 so as to include a reflecting plate 23, however, the second embodiment is generally similar to the first embodiment and, corresponding numerals have been applied to corresponding parts and detailed description therefor is omitted. On the inner peripheral wall of the cup-shaped member 15, there is provided an annular mounting portion 21 for receiving and locating the reflecting plate 23 and a plurality of projections 22 for retaining the reflecting plate. A plurality of small holes 24 are formed in the peripheral portion of the reflecting plate 23 to communicate the opposite sides thereof. The oil in the reservoir tank freely flows into a space defined between the reflecting plate 23 and the transparent window 16. The light from the outside of the reservoir tank is reflected by the reflecting plate 23, thus, the visual inspection can be performed very easily.

Figure 5:
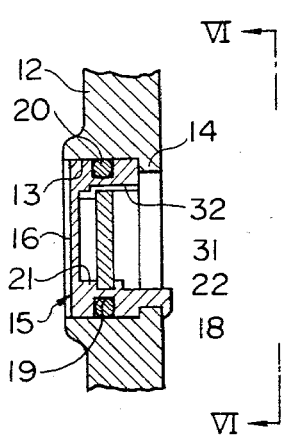
FIG. 5 is a partially sectional view similar to FIG. 3 but showing a third embodiment of the invention.
Figure 6:
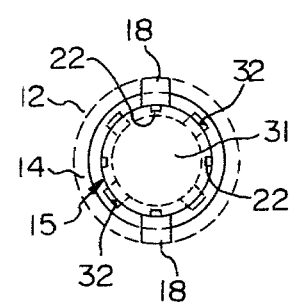
FIG. 6 is a side view taken along line VI—VI in FIG. 5.

The third embodiment shown in FIGS. 5 and 6 is generally similar to the second embodiment and corresponding numerals have been applied to corresponding parts, and detailed description therefor is omitted. In the embodiment, a plurality of communicating passages 32 one formed in the inner circumference of the cup-shaped member 15 so as to communicate the opposite sides of a reflecting plate 31.

It will be noted that, in the second embodiment, there are formed four retaining portions 18 on the cup-shaped member, while, in the third embodiment, only two retaining portions 18 are provided.

As described heretofore, according to the invention, the transparent window which functions as the peep hole is formed by a cup-shaped member which has a transparent bottom wall, and a plurality of retaining portions are provided adjacent the open end portion of the cup for engagement with the peripheral edge of an opening which is formed in a side wall of the reservoir tank such that the outer periphery of the cup is sealingly received. Thus, the construction is very simple, thereby simplifying the manufacturing process, reducing the costs and preventing the transparent window from slipping out of position.

The invention has been described in conjunction with a master cylinder having an integrally formed reservoir tank for use in hydraulic braking system of a vehicle, in which, the detection of the level of liquid in the reservoir tank can been performed so as to determine whether the liquid level approximates a predetermined level. However, the invention may be applied to other reservoir tanks having a peep hole for visually inspecting the interior of the tank and the pressure difference across the peep hole of the present invention is minimal.

What is claimed is:

1. A reservoir tank having:
   a side wall, said side wall having an opening therethrough with a flange projecting thereinto around the inner periphery thereof;
   a transparent window sealingly mounted within said opening, said transparent window comprising a cup-shaped member having an open end portion and a bottom portion;
   said bottom portion being transparent for allowing the visual inspection of the liquid level of said reservoir tank;
   said open end portion having a plurality of resilient pawl-shaped retaining members spaced around the periphery thereof; and
   said resilient retaining members having a flange engaging recess therein having the same dimension along said member as the thickness of said flange and being adjacent said open end whereby said members resiliently and snappingly engage said flange on the peripheral edge of said opening and tightly hold said cup-shaped member against the surface of said flange within said opening.

2. A reservoir tank as claimed in claim 1, wherein said reservoir tank includes a reflecting plate, said reflecting plate is positioned within the interior of said cup-shaped member and is axially spaced from said transparent bottom portion, and said reflecting plate has a plurality of holes in the peripheral portion thereof.

3. A reservoir tank as claimed in claim 1, wherein said reservoir tank includes a reflecting plate, said reflecting plate is positioned within the interior of said cup-shaped member and is axially spaced from said transparent bottom portion, and said cup-shaped member has a plurality of communicating passages in the inner periphery thereof for communicating the opposite sides of said reflecting plate.

* * * * *